Jan. 21, 1969 H. RÄDLER 3,423,519
SWITCHING ARRANGEMENT FOR THE ACTUATION OF A TARIFF-CHARGE DEVICE IN TELETYPE CONNECTIONS
Filed March 25, 1964
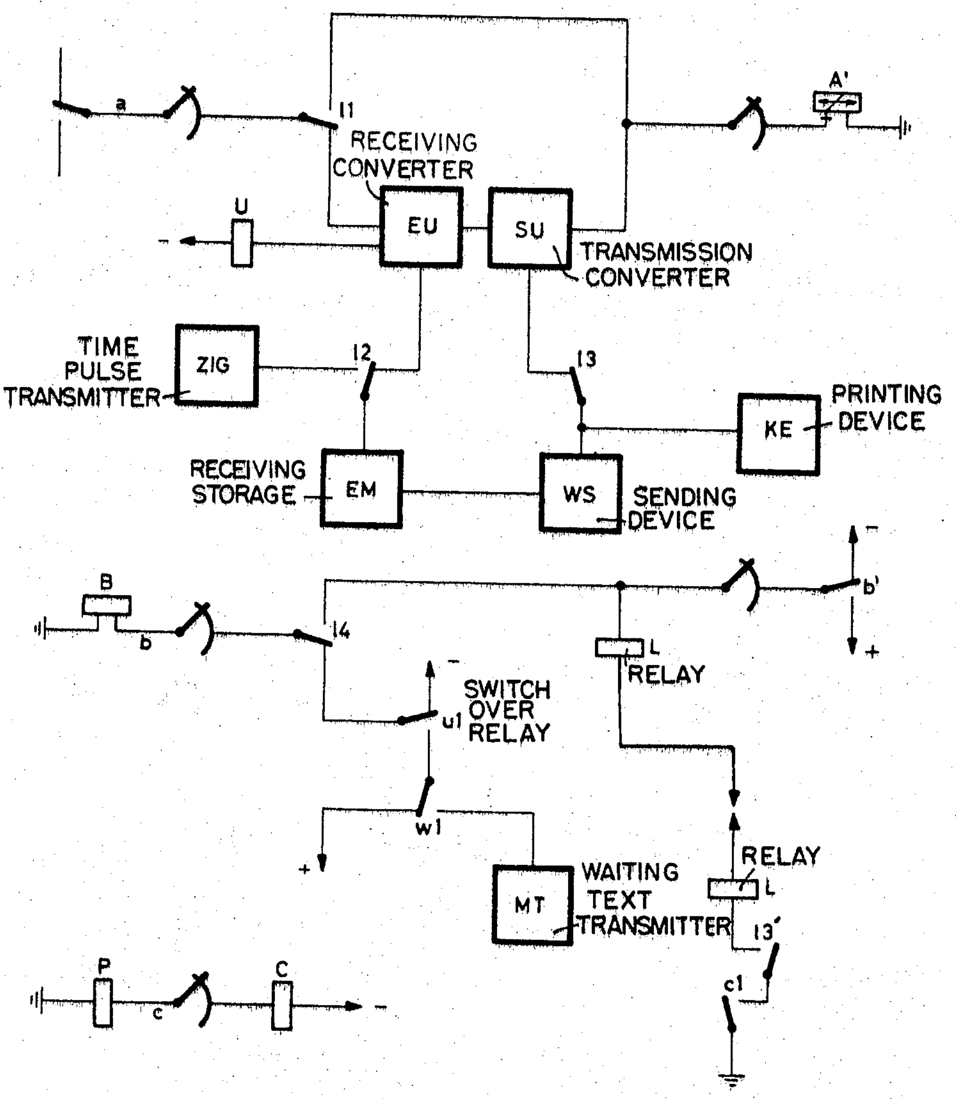

United States Patent Office 3,423,519

Patented Jan. 21, 1969

3,423,519

SWITCHING ARRANGEMENT FOR THE ACTUATION OF A TARIFF-CHARGE DEVICE IN TELETYPE CONNECTIONS

Herman Rädler, Munich, Germany, assignor to Siemens Aktiengesellschaft, a corporation of Germany Filed Mar. 25, 1964, Ser. No. 354,800
Claims priority, application Germany, Mar. 26, 1963, S 84,358
U.S. Cl. 178—2 9 Claims
Int. Cl. H04l 15/00

ABSTRACT OF THE DISCLOSURE

This invention is directed to a switching arrangement for energizing a charge or fee recording device for telegraph connections and includes means for receiving a predetermined coded call number from a calling subscriber to indicate the desire to make a connection with a preselected receiving subscriber. The coded call number is placed in a storage device and additionally actuates means for recording the coded call number. The means for recording the coded call number also includes means for actually making the connection between the calling subscriber and the receiving subscriber after the coded call number has been recorded and in response thereto.

The invention relates to a switching arrangement for the actuation of a tariff charge perforating device in connection with telegraph connections.

It is known practice in telegraph engineering to carry out the tariff-charge determination by the evaluation of each connection according to the duration of the connection and the distance between connections involved. For the charge determination in telegraph installations, time-zone counters are used which assess the connection according to these criteria and report the results on counters which are individually allocated to each subscriber.

While this type of charge determination is very reliable in itself, limitations arise when long distance connections are to be assessed, for example, international and intercontinental operations. In these operations the capacity of the counters is no longer sufficient to register the counting pulses over a relatively long period of time and it is then necessary to either (1) utilize shorter recording times or (2) to raise the capacity of the counters. These two possible measures result in an uneconomical determination of the charges, since in the first case an additional expenditure of personnel is necessary, and in the second case a considerable expenditure in switching and wiring is required.

A further disadvantage encountered in long distance connections is that the charges running up on the counter are totalized, appearing only as a total charge over a certain period of time. It therefore is not possible, in this manner, to obtain a signal which is indicative of specific connections and define a charge record in another form.

Devices which have this disadvantage, as is well known, rely on the preparation, for such a chargeable connection, a charge voucher in note or slip form, on which there are marked subscriber identification and time data. This type of charge determination is used particularly where connections involving higher charges frequently occur, for example, in international communications. In a known manner, the data needed for the charge determination is stored in a storage device, for example, a perforated card storer, and after termination of the connection, the data are fed over a card conveyor to an evaluating device, for example, a computing device, which from the data determines elapsed time and subscriber designations, and by difference formation and multiplication determines the charge. A telegraph machine, designed as a sheet printer, prints the result in note or slip form and delivers the desired voucher. In these known devices for charge determination, which automatically deliver a charge voucher, it is usual to record the selection information parallel to the connection build-up and after initiation of the writing operation to ask successively the identification of the calling and of the called subscribers which is stored in the charge punch device. Since in many cases upon the start of the writing operation, data is automatically transmitted in the form of telegraph signals, for example, date, clock time, subscriber identification, etc., the danger of a mutilation or mixing up of the data cards is very great. Moreover, a charge voucher is there produced for each connection, regardless of whether or not there is need therefor or any interest therein, since the entire device is fixedly allocated to the communication path.

The object of this invention is to avoid these disadvantages in the connection assessment and the charge determination. It is solved according to the invention by a method such that by preselection of a particular call number the time-zone counter is disconnected from the communication path and a charge, perforating device is connected thereto.

In order to facilitate the identification of the calling subscriber and to assure the correctness of the subscriber identification designation necessary for the connection assessment with greatest certainty, it is possible, within the scope of the invention, for both the selector information and also the identification designation of the calling subscriber, or of only one of the two to be recorded, before the completion of the connection. This can be done in such a manner that, following completion of the selecting operation and after recording of the selector information, the telegraph machine of the calling subscriber is connected and from a message text transmitter a message or a wait text is sent to the caller which ends with the combination "who's calling." The identification designation, thereupon is fed into the charge perforating device, and is likewise recorded on the perforated charge strip before the establishment of the connection.

In this manner the recording of the selector information and of the subscriber designations takes place on the perforated charge strip without any difficulty. Since the selector information data stored on the charge strip is utilized for the establishment of the connection, it is further assured that failures in the charge perforating device such as failures in the paper transport, breakage of a perforating punch, etc., are ascertained in adequate time.

The details of the invention are explained with the aid of the wiring block diagram illustrated in the drawing.

Since the charge perforation device can be controlled by a selector stage, the three conductors *a*, *b*, and *c* of a group selector are represented. In a known manner, over the c-conductor hunting is carried out onto a C-relay of the charge perforation device. Thereupon, the selector signals of the calling subscriber coming in over contact 11 are received at a receiving converter EU, which suitably converts the selector signals and retransmits them over the contact 12, disposed in rest position, to a magnetic storer EM of a perforated strip transmitter. The type of recording of the indicia on the perforated strip, as well as its further conveyance, is here of minor importance and for this reason is not represented.

The end of the selection is recognized in the receiving converter EU of the charge perforation device by the fact that either in the case of keyboard selection, a selection end sign is ascertained, or, in the case of number dial selection, a minimum number of digits with subsequent relatively long pause is ascertained. Simultaneously therewith, in a manner not represented, a switch-over relay U is energized, whereby the contact *u*1 thereof, over which marking current flows from the b-conductor, then transmits back to the calling subscriber spacing current over the still closed contact *w*1, contact *u*1 and contact 14, in rest position. Thereby the telegraph machine of the calling subscriber is connected. A relay W, represented in the illustrated circuit only by its contact W1, is energized after a brief time (the starting time of the telegraph machine) in such a way that its contact *w*1 disconnects the b-conductor from plus (+) and connects a message or wait text transmitted MT, which transmits back a corresponding text over the actuated contacts *w*1 and *u*1 and over the contact 14 situated in rest position to the calling subscriber. At the end of this message text, the identification of the calling subscriber is automatically requested, which is conducted over the a-conductor and the unactuated contact 11 to the receiving converter EU, and after suitable conversion is recorded over the unactuated contact 12 on the charge strip of the charge perforating device. Thereby both the selector information sent out by the calling subscriber and his identification are recorded on the perforated charge strip, even before the connection operation is begun.

It is only after the recording of this information that the connection is established. This takes place in such a way that a further sending device WS in the charge perforating device scans the selector information and transmits it over the unactuated contact 13 to a transmission converter SU, which reconverts the selector information into pulses, and establishes the connection to the desired subscriber. Through a permanent stop potential the successful establishment of the connection is recognized in the charge perforating device and automatically the identification of the called subscriber is demanded, which is further transmitted, either simultaneously with the recording in the storer of the charge punch device or immediately thereafter to the subscriber, so that the start of the writing state of the called subscriber is also indicated to the calling subscriber. Simultaneously therewith a relay L is energized, which is held over its contact 13' and the contact *c*1, closed in preparation of the busy relay C, for the duration of the connection and whose individual contacts execute the following functions:

The contact 11 disconnects the charge perforating device from the a-conductor and therewith connects the two subscribers. The actuated contact 12 connects a time pulse transmitter ZIG to the charge perforating device for the duration of the connection, which, during the connection, continuously sends time pulses to the perforated charge strip, while the contact 13 separates the scanning and sending device WS from the a-conductor, so that the telegraph symbols punched on the perforated strip can pass, without affecting the existing connection, to a control device KE. Finally, the contact 14 switches through the b-lead.

Changes may be made within the scope and spirit of the appended claims which define what is believed to be new and desired to have protected by Letters Patent.

I claim:

1. A switching arrangement for energization of a charge recording device of strip perforating type for telegraph connections comprising:

means for receiving a predetermined coded call number from a calling subscriber to indicate the desire to make a connection with a receiving subscriber;

means for storing said coded call number;

means for recording said coded call number and switch means responsive to said means for recording to connect the calling subscriber with the receiving subscriber after said means for recording has recorded said coded call number.

2. A switching arrangement according to claim 1, characterized by the feature that a checking device is provided, which makes it possible to monitor the telegraph signs punched on the perforated strip without influencing an existing connection.

3. A switching arrangement according to claim 1, characterized by the feature that the recorded code call numbers sent out by the calling subscriber are utilized for the extension of the desired communication path, by scanning the storage means and the following selector stages set accordingly.

4. A switching arrangement according to claim 1, characterized by the feature that during the connection, a time pulse transmitter is connected to the means for storing, and code combinations are punched which indicate the duration of the connection.

5. A switching arrangement according to claim 3, characterized by the feature that the calling subscriber, even after the sending out of the preselection and call number continues to remain connected with the charge perforation device, and after recording of his identification in such device, the latter is shifted into a waiting state, during which the connection is completed to the called subscriber, and that the identification of the latter passes over the storage device to the calling subscriber.

6. A switching arrangement according to claim 5, characterized by the feature that after completion of the selection, a relay is energized, whose contact switches off marking current and sends back spacing current to the calling subscriber, whereby the telegraph machine of the latter is thereby switched on.

7. A switching arrangement according to claim 5, characterized by the feature that to the calling subscriber there is provided by a text transmitter a message or wait text and that this text ends with the combination "who's calling."

8. A switching arrangement according to claim 5, characterized by the feature that the identification of the calling subscriber passes over a receiving converter to a storage device of the charge perforating device and is recorded before the making of connection.

9. A switching arrangement according to claim 5, characterized by the feature that the identification of the called subscriber passes over a transmitting device to the charge perforating device and, after recording, is retransmitted to the calling subscriber.

References Cited

UNITED STATES PATENTS

| | | | |
|---|---|---|---|
| 2,339,803 | 1/1944 | Potts | 178—2.6 |
| 2,618,708 | 11/1952 | Ostline. | |

THOMAS A. ROBINSON, *Primary Examiner.*

U.S. Cl. X.R.

178—17.5; 179—7.1